United States Patent
Sarkisian et al.

(10) Patent No.: US 7,501,017 B2
(45) Date of Patent: Mar. 10, 2009

(54) SELF-DISPERSED PIGMENT MIXTURES FOR INK-JET APPLICATIONS

(75) Inventors: George Sarkisian, San Diego, CA (US); Xiaohe Chen, San Diego, CA (US); Dennis Guo, San Diego, CA (US); Jodi Bates, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 11/070,138

(22) Filed: Mar. 1, 2005

(65) Prior Publication Data

US 2006/0084721 A1    Apr. 20, 2006

Related U.S. Application Data

(60) Provisional application No. 60/620,900, filed on Oct. 20, 2004.

(51) Int. Cl.
*C09D 11/02* (2006.01)
*C09D 11/10* (2006.01)

(52) U.S. Cl. .............. 106/31.89; 106/31.13; 106/31.6; 106/31.65

(58) Field of Classification Search ............ 106/31.6, 106/31.65, 31.86, 31.89
See application file for complete search history.

(56) References Cited

U.S. PATENT DOCUMENTS

| 5,630,868 | A | 5/1997 | Belmont |
| 6,214,100 | B1 | 4/2001 | Parazak et al. |
| 6,224,660 | B1 | 5/2001 | Stubbe et al. |
| 6,440,203 | B2 * | 8/2002 | Kato ................ 106/31.6 |
| 6,790,268 | B2 | 9/2004 | Lee et al. |
| 7,220,303 | B2 * | 5/2007 | Tyvoll ............... 106/31.6 |
| 2005/0223938 | A1 * | 10/2005 | Tyvoll ............... 106/31.6 |

FOREIGN PATENT DOCUMENTS

| EP | 1114851 | 7/2001 |
| WO | 0110963 | 2/2001 |

OTHER PUBLICATIONS

Inks. R. W Bassemir et al. Kirk Othmer Encyclopedia of Chemical Technology. 2004, pp online [retrivied Feb. 7, 2008] from URL <http://mrw.interscience.wiley.com/emrw/9780471-238966 / kirk / article / inksbass . a01 / current / html ? hd = All,ink &hd=All,formulations>.*
Printing. (2008). In Encyclopaedia Britannica. Retrieved Jul. 3, 2008, from Encyclopaedia Britannica Online: http://www.search.eb.com/eb/article-36901.*
European Search Report; Nov. 2, 2007, 5 pgs.

* cited by examiner

*Primary Examiner*—Sanza L McClendon

(57) ABSTRACT

Compositions, systems, and methods of printing an ink-jet image are provided. The composition can be an ink-jet ink, comprising a liquid vehicle; from 0.5 wt % to 10 wt % of a polymer-dispersed pigment; and from 0.5 wt % to 10 wt % of a self-dispersed pigment selected from the group consisting of a second polymer-dispersed pigment and a small molecule-dispersed pigment.

25 Claims, No Drawings

US 7,501,017 B2

SELF-DISPERSED PIGMENT MIXTURES FOR INK-JET APPLICATIONS

CLAIM OF PRIORITY

This application claims the benefit of U.S. Provisional Patent Application No. 60/620,900, filed on Oct. 20, 2004, which is incorporated by reference herein in its entirety.

FIELD OF THE INVENTION

The present invention relates generally to ink-jet ink compositions. More particularly, the present invention relates to pigment-based ink-jet inks that exhibit improved print quality, optical density, durability, reliability, and dry time.

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, improved durability, etc.

As new ink-jet inks are developed, there have been several traditional characteristics to consider when evaluating the ink in conjunction with a printing surface or substrate. Such characteristics include edge acuity and optical density of the image on the surface, black to color bleed control, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging, and long term print durability. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Particularly, it is desirable to have a balance of high print quality, high optical density, good durability, and fast dry time, particularly on plain paper applications. Typically, this balance has been sought by the addition of surfactants, resins, solvents, and other functional reagents. The amount of these additives that can be added is often limited due to ink-jet architecture reliability requirements. As such, investigations continue in improving these characteristics, while maintaining good ink-jet architecture reliability.

SUMMARY OF THE INVENTION

It has been recognized that it would be advantageous to develop pigment-based ink-jet ink compositions that exhibit high print quality, high optical density, good durability, and fast dry time, while maintaining acceptable ink-jet architecture reliability. In one aspect of the present invention, an ink-jet ink can comprise a liquid vehicle; from 0.5 wt % to 10 wt % of a polymer-dispersed pigment; and from 0.5 wt % to 10 wt % of a self-dispersed pigment selected from the group consisting of a second polymer-dispersed pigment and a small molecule-dispersed pigment.

In another embodiment, a method of printing an image can comprise ink-jetting an ink-jet ink onto a media substrate. The ink-jet ink can include a liquid vehicle; from 0.5 wt % to 10 wt % of a polymer-dispersed pigment; and from 0.5 wt % to 10 wt % of a self-dispersed pigment selected from the group consisting of a second polymer-dispersed pigment and a small molecule-dispersed pigment.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants, including pigments, to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. Though not part of the liquid vehicle per se, in addition to the colorants, the liquid vehicle can carry solid additives such as polymers, latex particulates, UV curable materials, plasticizers, salts, etc.

As used herein, "pigment" refers to a colorant particle which is typically substantially insoluble in the liquid vehicle in which it is present.

"Self-dispersed pigment," "dispersant-functionalized pigment," or a derivation thereof, refers to pigments that have been functionalized with dispersing agent, such as by chemical attachment of the dispersing agent to the surface of the pigment. The dispersing agent can be a small molecule or a polymer. In one embodiment, dispersing agents can be attached to such pigments to provide the outer shell of the pigment with a charge, thereby creating a repulsive nature that reduces agglomeration of pigment particles within the liquid vehicle.

The term "polymer-attached pigment" or "polymer-dispersed pigment" refers to a type of self-dispersed pigment wherein a polymer is attached to at least an outer shell of the pigment. Examples of polymers that can be attached to the pigment include styrene maleic anhydrides, polyethylene imine/phthalic anhydrides, polyethylene imine/phenylsuccinic anhydrides, polyethylene imine/succinic anhydrides, pentaethylene hexamines, polyethylene imines, polyurethanes, polyureas, acrylic polymers, vinyl polymers, polypyrrolidones, epoxies, polyesters, polysaccharides, polypeptides, celluloses, polyquats, polyamines, and copolymers thereof.

The term "small molecule-attached pigment" or "small molecule-dispersed pigment" refers to a type of self-dispersed pigment wherein a non-polymeric small molecule is attached to at least an outer shell of the pigment. Examples of small molecules that can be attached to the pigment include carboxyl groups, sulfonic groups, isophthalic groups.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The term "about" when referring to a numerical value or range is intended to encompass the values resulting from experimental error that can occur when taking measurements.

In accordance with the present invention, an ink-jet ink is provided that includes a liquid vehicle; from 0.5 wt % to 10 wt % of a polymer-dispersed pigment; and from 0.5 wt % to 10 wt % of a self-dispersed pigment selected from the group consisting of a second polymer-dispersed pigment and a small molecule-dispersed pigment. The liquid vehicle can comprise from about 70 wt % to about 99 wt % of the ink-jet ink composition. Other than the liquid vehicle and the pigment solids, other compositions can be present in the ink-jet ink as well, such as binders, latex particulates, UV curable materials, plasticizers, salts, etc. Both cationic and anionic polymers can be used to modify the surface of both the polymer-dispersed pigment and the self-dispersed pigment (if the self-dispersed pigment is also a polymer-dispersed pigment). Each of the at least two pigments present in the ink-jet ink composition can be essentially of the same color, or can be of different colors. For example, the polymer-dispersed pigment and the self-dispersed pigment can both be black pigments, cyan pigments, magenta pigments, yellow pigments, etc. Alternatively, each pigment can be of a different color in some embodiments.

In another embodiment, a method of printing an image can comprise ink-jetting an ink-jet ink onto a media substrate. Again, the ink-jet ink can include a liquid vehicle; from 0.5 wt % to 10 wt % of a polymer-dispersed pigment; and from 0.5 wt % to 10 wt % of a self-dispersed pigment selected from the group consisting of a second polymer-dispersed pigment and a small molecule-dispersed pigment. With respect to this method, the images prepared can be ink-jetted onto fibrous plain paper substrates with acceptable results, though other substrates can also be used, e.g., porous media, plastic overhead sheets, etc. By including two self-dispersed pigments, at least one being a polymer-dispersed pigment, dry time and durability can be improved. For example, the dry time of an image printed with ink-jet inks described herein can be faster than the dry time of an identical comparative image printed with an ink-jet ink that contains only one of the polymer-dispersed pigment and the self-dispersed pigment. Additionally, the durability as measured wet smudge resistance of an image printed with an ink-jet ink of the present invention can be greater than the durability of an identical comparative image printed with an ink-jet ink that contains only one of the polymer-dispersed pigment and the self-dispersed pigment.

Self-dispersed Pigments

The term "self-dispersed pigments," as described previously, includes pigments that have been modified by a polymer or a small molecule. Thus, "small molecule-dispersed pigments" and "polymer-dispersed pigments" are both considered "self-dispersed pigments." The base pigment that can be modified and used can be of any color, such as black, magenta, cyan, or yellow, for example. Though the present invention can use any color pigment, and though any color of pigment is within the scope of the present invention, black pigments are primarily described herein to favorably illustrate unique advantages of the present invention.

Examples of black pigments that can be used include carbon pigments. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. Such carbon pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates. Unmodified pigments can be modified with small molecules or polymers to be used in accordance with embodiments of the present invention.

As described previously, small molecule-dispersed pigments refer to a type of self-dispersed pigment wherein a non-polymeric small molecule is attached to at least an outer shell of the pigment. For example, one type of pigment that is considered a small molecule-dispersed pigment is a carbon black pigment having a diazonium salt of an aromatic acid directly attached thereto by a covalent bond to the carbon.

Many different types of small molecule-dispersed pigments and polymer-dispersed pigments can be prepared, as exemplified in Formula 1 below.

Formula 1

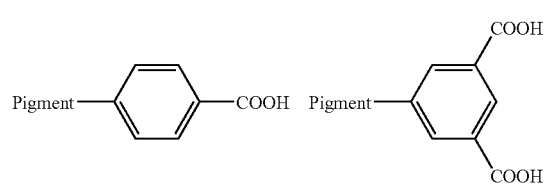

-continued

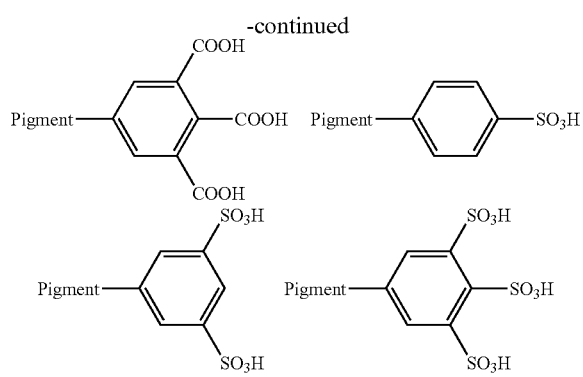

Though Formula 1 above shows exemplary small molecule-dispersed pigments, other variations can also be prepared, including mixed functional groups on a common pigment. For example, a pigment can be modified with multiple types of acid groups. Though carboxyl and sulfonic groups are exemplified above, other acid groups can also be used to modify the pigment, such as isophthalic acid, propionic acid, butyric acid, etc.

The preparation of polymer-dispersed pigments can be by any of a number of methods. For example, polymeric resins can be attached to pigments by beginning with a diazonium attachment group, which can be attached to a base carbon of the pigment. The intermediate structure can then be treated with appropriate polymers to form anionic, cationic, or nonionic black pigments. The reactive group can be a vinyl sulphone, for example, as vinyl sulphone groups can be a very versatile intermediate to attach polymers to carbon. Amines can readily add to the vinyl bond to form cationic or nonionic pigments. Further, thermal condensation with the amine attached pigments and styrene-acrylic acid polymers can then be used to form anionic pigments, if desired. There are also numerous other methods that can be used to prepare polymer-dispersed pigments, as are known by those skilled in the art.

When selecting polymers for use in attaching to pigments, several properties or conditions can be evaluated. For example, polymeric molecular weight and acid number can be considered. Though any functional molecular weight can be used, it has been discovered that polymers having a molecular weight from about 4,000 Mw to 15,000 Mw are particularly desirable for use. The higher molecular weight polymers tend to provide better durability, but also provide higher viscosity, which can be problematic for thermal ink-jet applications. However, there is more chance for particle interaction with the vehicle and with other particles when the polymer strands are long. An example of such a polymer includes styrene-acrylic polymers. Styrene/acrylic polymers, as well as other desirable polymers that can be used, include acid functional groups on the polymer chain. The number of acid functional groups can be quantified by determining the acid number of the polymer. The acid number is based on the grams of potassium used to neutralize a gram of solid resin. The determined ratio provides a positive number. Higher numbers are more acidic, and thus, tend to have poorer water resistance. Lower numbers are more hydrophobic and have better water resistance, but if too low, can be more difficult to disperse in liquid vehicles. Though any acid number can be selected for use that is functional, acid numbers from about 100 to 220 provide acceptable results.

In addition to the styrene-acrylic polymers that can be attached to pigments, other polymers can also be attached to pigments in accordance with embodiments of the present invention, including either cationic or anionic polymers. Specific examples of such polymers include styrene maleic anhydrides, polyethylene imine/phthalic anhydrides, polyethylene imine/phenylsuccinic anhydrides, polyethylene imine/succinic anhydrides, pentaethylene hexamines, polyethylene imines, polyurethanes, polyureas, acrylic polymers, vinyl polymers, polypyrrolidones, epoxies, polyesters, polysaccharides, polypeptides, celluloses, polyquats, polyamines, and copolymers thereof.

In still further detail, the pigments of the present invention can be from about 30 nm to about 180 nm in average aggregate particle size. However, sizes outside this range can be used if the pigment can remain dispersed in the liquid vehicle and provide adequate color properties.

Liquid Vehicle

The ink-jet ink compositions of the present invention are typically prepared using an aqueous formulation or liquid vehicle which can include water, cosolvents, surfactants, buffering agents, biocides, sequestering agents, viscosity modifiers, humectants, binders, and/or other known additives. Typically the ink-jet ink compositions of the present invention have a viscosity of between about 0.8 cps to about 15 cps, and in one embodiment, can be from about 0.8 cps to about 8 cps. In one aspect of the present invention, the liquid vehicle can comprise from about 70 wt % to about 99 wt % of the ink-jet ink composition.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 3 wt % to about 50 wt %, and in one embodiment is from about 10 wt % to about 30 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide;

citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

In an additional aspect of the present invention, binders can be included which act to secure the colorants on the substrate. Binders suitable for use in the present invention typically have a molecular weight of from about 1,000 Mw to about 20,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

Surfactants can also be used, such as alkyl polyethylene oxides, alkyl phenyl polyethylene oxides, polyethylene oxide (PEO) block copolymers, acetylenic PEO, PEO esters, PEO amines, PEO amides, and dimethicone copolyols can be used, include commercial names such as Tergitols®, Surfynols®, Zonyls®, and combinations thereof. If used, the surfactants can be present at from 0.01% to about 10% by weight of the ink-jet ink composition.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Ink-jet Ink Preparation

Six ink-jet inks (Formulas A-F) were prepared using six different pigment combinations in identical liquid vehicles. The liquid vehicle and other solids (other than the pigments) used for each ink-jet ink is provided in Table 1, as follows:

TABLE 1

| Liquid Vehicle Components | Wt % |
| --- | --- |
| Joncryl 586 Resin | 1.7 |
| Fluorosurfactant | 0.2 |
| Surfynol 61 | 1 |
| 2-pyrrolidone | 7 |
| 1,2-hexanediol | 4 |
| Ethoxylated glycerol | 1.5 |
| Proxel GXL | 0.2 |
| water | balance |

The six different pigment combinations dispersed in each liquid vehicle is provided as Table 2, as follows:

TABLE 2

| Pigments | Ink A | Ink B | Ink C | Ink D | Ink E | Ink F |
| --- | --- | --- | --- | --- | --- | --- |
| Styrene maleic anhydride-dispersed pigment | 3 wt % | 2 wt % | 2 wt % | 2 wt % | 1.5 wt % | 2 wt % |
| Polyethylene imine/phthalic anhydride-dispersed pigment | — | 1 wt % | — | — | — | — |
| Polyethylene imine/phenyl succinic anhydride-dispersed pigment | — | — | 1 wt % | — | 1.5 wt % | — |
| Polyethylene imine/succinic anhydride-dispersed pigment | — | — | — | 1 wt % | — | — |
| Isophthalic acid-dispersed pigment | — | — | — | — | — | 1 wt % |

Example 2

Optical Density and Wet Smudge Resistance

Each of the six ink-jet ink compositions prepared in accordance with Example 1 were tested for wet smudge resistance in order to determine relative durability. The results of the wet smudge test are provided below in Table 3, as follows:

TABLE 3

| Ink Formula | Initial OD of printed image | OD of smudge trail after wet smudge |
| --- | --- | --- |
| A (control) | 1.43 | 0.18 |
| B | 1.47 | 0.20 |
| C | 1.49 | 0.13 |
| D | 1.50 | 0.23 |
| E | 1.47 | 0.18 |
| F | 1.51 | 0.20 |

As can be seen from Table 3, the optical density (OD) of images printed with multiple self-dispersed pigments (Formulas B-F) was greater than the OD of the image printed with a single self-dispersed pigment (Formula A). Also shown in Table 3 are the results related to smudge resistance. Specifically, smudge performance was tested as several printed bars were "wet smudged" by deliberately attempting to cause a smudge trail after printing. The wet smudge test was conducted by dropping 0.25 cc of water onto each image and smudging the dampened area with a finger. In each printed sample, the smudge trail was relatively minimal. More specifically, for many of the samples, despite the increased OD for Ink Formulas B-F, the wet smudge resistance was roughly the same. Surprisingly, the Formula C ink actually exhibited improved smudge resistance.

Example 3

Ink-jet Ink Preparation

Four ink-jet inks (G-J) were prepared using four different pigment combinations and identical liquid vehicles. The liquid vehicle used for each ink-jet ink is provided in Table 4, as follows:

TABLE 4

| Liquid Vehicle Components | Wt % |
|---|---|
| Fluorosurfactant | 0.1 |
| Surfynol 61 | 0.5 |
| 2-pyrrolidone | 4 |
| 1,2,6-Hexanetriol | 10 |
| Ethoxylated glycerol | 4 |
| water | balance |

The four different pigment combinations dispersed in each liquid vehicle is provided in Table 5, as follows:

TABLE 5

| Pigments | Ink G | Ink H | Ink I | Ink J |
|---|---|---|---|---|
| Pentaethylene hexamine-dispersed pigment | 4 | 2 | 3 | 2 |
| Polyethylene imine-dispersed pigment (<1,000 Mw) | — | 2 | — | 1 |
| Polyethylene imine-dispersed pigment (2,000 to 10,000 Mw) | — | — | 1 | 1 |

Example 4

Optical Density and Dry Time

Each of the four ink-jet ink compositions prepared in accordance with Example 3 were tested for optical density and dry time. The results of these tests are provided below in Table 6, as follows:

TABLE 6

| Ink Formula | OD | Dry time |
|---|---|---|
| G (control) | 1.59 | 15 |
| H | 1.55 | 10 |
| I | 1.55 | 10 |
| J | 1.54 | 10 |

As can be seen from Table 6 above, the optical density (OD) of all o the images printed was quite high. Also shown in Table 6 are the results related to dry time of each printed image. The images printed using multiple self-dispersed pigments (Formulas H-J) had a significantly faster dry time compared to the control ink (Formula G).

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink, comprising
   a) a liquid vehicle;
   b) from 0.5 wt % to 10 wt % of a polymer-dispersed pigment; and
   c) from 0.5 wt % to 10 wt % of a self-dispersed pigment selected from the group consisting of a second polymer-dispersed pigment and a small molecule-dispersed pigment.

2. An ink-jet ink as in claim 1, wherein the liquid vehicle comprises from about 70 wt % to about 99 wt % of the ink-jet ink composition.

3. An ink-jet ink as in claim 1, wherein the self-dispersed pigment is the second polymer-dispersed pigment.

4. An ink-jet ink as in claim 1, wherein the self-dispersed pigment is the small molecule-dispersed pigment.

5. An ink-jet ink as in claim 1, wherein the polymer-dispersed pigment is an anionic polymer-dispersed pigment.

6. An ink-jet ink as in claim 1, wherein the polymer-dispersed pigment is a cationic polymer-dispersed pigment.

7. An ink-jet ink as in claim 4, wherein the small-molecule dispersed pigment is selected from the group consisting of a sulfonic acid-dispersed pigment, a carboxyl acid-dispersed pigment, and an isophthalic acid-dispersed pigment.

8. An ink-jet ink as in claim 1, wherein the polymer-dispersed pigment is a styrene maleic anhydride-dispersed pigment.

9. An ink-jet ink as in claim 8, wherein the self-dispersed pigment is the second polymer-dispersed pigment, said second polymer-dispersed pigment being selected from the group consisting of a polyethylene imine/phthalic anhydride-dispersed pigment, a polyethylene imine/phenylsuccinic anhydride-dispersed pigment, and a polyethylene imine/succinic anhydride-dispersed pigment.

10. An ink-jet ink as in claim 8, wherein the self-dispersed pigment is the small molecule-dispersed pigment, said small molecule-dispersed pigment being an isophthalic acid-dispersed pigment.

11. An ink-jet ink as in claim 1, wherein the polymer-dispersed pigment is a pentaethylene hexamine-dispersed pigment.

12. An ink-jet ink as in claim 11, wherein the self-dispersed pigment is the second polymer-dispersed pigment, said second polymer-dispersed pigment being a polyethylene imine-dispersed pigment.

13. An ink-jet ink as in claim 1, wherein the polymer-dispersed pigment is a styrene/acrylic polymer-dispersed pigment.

14. An ink-jet ink as in claim 1, wherein the polymer-dispersed pigment and the self-dispersed pigment are both black pigments.

15. An ink-jet ink as in claim 1, wherein the polymer-dispersed pigment and the self-dispersed pigment are both non-black pigments.

16. A method of printing an image, comprising ink-jetting an ink-jet ink onto a media substrate, said ink-jet ink including:

a) a liquid vehicle;
b) from 0.5 wt % to 10 wt % of a polymer-dispersed pigment; and
c) from 0.5 wt % to 10 wt % of a self-dispersed pigment selected from the group consisting of a second polymer-dispersed pigment and a small molecule-dispersed pigment.

17. A method as in claim 16, wherein the media substrate is a fibrous plain paper substrate.

18. A method as in claim 16, wherein the self-dispersed pigment is the second polymer-dispersed pigment.

19. A method as in claim 16, wherein the self-dispersed pigment is the small molecule-dispersed pigment.

20. A method as in claim 16, wherein the polymer-dispersed pigment is an anionic polymer-dispersed pigment.

21. A method as in claim 16, wherein the polymer-dispersed pigment is a cationic polymer-dispersed pigment.

22. A method as in claim 16, wherein the polymer-dispersed pigment and the self-dispersed pigment are both black pigments.

23. A method as in claim 16, wherein the polymer-dispersed pigment and the self-dispersed pigment are both non-black pigments.

24. A method as in claim 16, wherein the dry time of the image is faster than the dry time of an identical comparative image printed with an ink-jet ink that contains only one of: i) the polymer-dispersed pigment, and ii) the self-dispersed pigment.

25. A method as in claim 16, wherein the durability as measured by wet smudge resistance of the image is greater than the durability of an identical comparative image printed with an ink-jet ink that contains only one of: i) the polymer-dispersed pigment, and ii) the self-dispersed pigment.

* * * * *